United States Patent Office 2,724,408
Patented Nov. 22, 1955

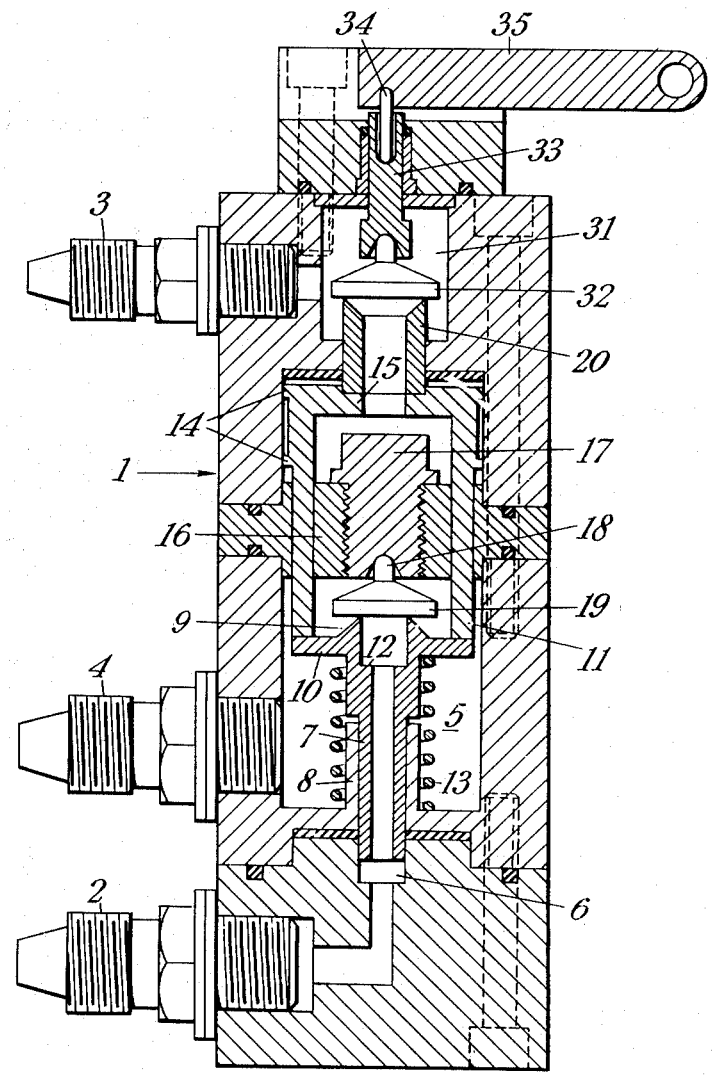

2,724,408

FLUID PRESSURE CONTROL VALVE

Henry William Trevaskis, Solihull, and Leslie William Wilkins, Keresley, Coventry, England, assignors to Dunlop Rubber Company Limited, London, England, a British company Application February 2, 1953, Serial No. 334,602

Claims priority, application Great Britain April 18, 1952

3 Claims. (Cl. 137—620)

This invention relates to fluid pressure control valves, more particularly to valves for selectively controlling hydraulically operated mechanisms, e. g. aircraft brakes, and is an improvement in or modification of the invention claimed in our U. S. application Serial No. 200,021, filed December 6, 1950, now Patent No. 2,682,282.

In said Patent 2,682,282 a fluid pressure control valve is described having a number of advantages over control valves hitherto known, inasmuch as in a control valve constructed in accordance with that invention only a light force on, and a negligible movement of, the operating means is sufficient to operate the valve. Another advantage of this type of control valve is that the operating pressure obtained is directly proportional to the force on the operating plunger. Yet another advantage of this type of control valve is that it is small, light and compact and has a small number of movable parts.

In U. S. Patent 2,682,282 supra, there is described a fluid pressure control valve comprising co-axial operating and exhaust chambers, a cradle associated with an inlet valve, and means associated with an exhaust valve for moving the cradle against a spring load to allow the inlet valve to open. The inlet valve is formed by an orifice in an inlet tube which is sealed by a ball carried by the cradle.

The present application is concerned with a modification of the valve described in the above specification, in which an inlet valve seat having a tubular stem is associated with the cradle and is axially movable therewith.

According to the invention a fluid pressure control valve comprises a housing containing an operating chamber adapted to be connected to a mechanism to be operated and a co-axial exhaust chamber adapted to be connected to exhaust, an inlet tube axially slidable in one end of the operating chamber and communicating with a connection for fluid pressure, one end thereof being provided with an inlet valve seat, an inlet valve co-operating with said seat and associated with a fixed abutment, a cradle axially slidable in the operating chamber, one end thereof being associated with said valve seat, a co-axial passage between said operating and exhaust chambers, an exhaust valve seat in the exhaust chamber having a tubular portion slidably fitting through said passage and seated on the other end of the cradle, an exhaust valve associated with said exhaust valve seat and with a plunger extending through the exhaust chamber and projecting exterior of said housing and a compression spring urging the inlet valve seat and cradle in a direction to close the inlet valve, whereby a load on said plunger in one direction first closes the exhaust valve and then moves the cradle against the spring to open the inlet valve and allow pressure fluid from the source to flow into the operating chamber until the pressure in said chamber, acting on the face of the exhaust valve, overcomes the load on the plunger to move the exhaust valve and allow the inlet valve to close.

Preferably the valve seat end of the inlet valve tube is provided with an inwardly-extending step having a radial width equal to the thickness of the wall of the tube. Thus when the inlet valve is closed the tube is "balanced," and very little force is required to "crack" the valve.

In order that the invention may be more fully described, reference is made to the accompanying drawing which is a longitudinal cross-section of a control valve constructed in accordance with one embodiment of the invention.

In this embodiment of the invention a control valve is provided for the selective control of aircraft hydraulic brakes. The valve comprises a housing 1 provided with three nozzles for pressure fluid, i. e. an inlet nozzle 2 adjacent one end of the housing for connection to a source of pressure fluid, an exhaust nozzle 3 adjacent the other end for connection to a fluid reservoir and an intermediate outlet nozzle 4 which is connected to the aircraft brakes.

The intermediate nozzle 4 is connected to a cylindrical operating chamber 5 within the housing. The inlet nozzle 2 located at one end of the housing leads into a port 6 in which one end of a tubular valve stem 7 is fluid-tightly and axially slidable. Said tube 7 extends co-axially into the operating chamber, a part thereof being slidable in an annular guide 8 extending coaxially from the mouth of said port.

The end of the tube within the chamber is formed as a valve seat 9 and extending radially therefrom is an annular flange 10 which forms one end of a cradle 11 which is slidable in the operating chamber. The valve seat end of the tube 7 at the inner diameter thereof is provided with an inwardly-extending annular step 12 having a radial width equal to the thickness of the wall of the tube. Thus when the inlet valve is closed the tube is "balanced," i. e. the force caused by the inlet pressure and acting in one direction is balanced by the force acting in the opposite direction. A light helical spring 13, encircling the tube and guide, is fitted in compression between the bottom of the operating chamber and the annular flange of the valve seat.

The cradle 11 is substantially cylindrical in shape, the outer periphery being provided with annular ribs 14 which slidably engage the inner peripheral wall of the operating chamber 5. One end of the said cradle is secured to the annular flange 10, the other end being provided with an inwardly-extending annular flange 15. The cylindrical part of the cradle is provided with two diammetrically-opposed, axially-extending slots (not illustrated) providing communication between the inside and outside of the cradle and a beam 16 extends therethrough and diametrically across the operating chamber, being rigidly secured to the walls thereof. The slots are long enough to permit the cradle to slide a certain amount in both directions. A hole, extending axially through the centre of the beam, is threaded and a plug 17 is screwed therein. The end face of the plug adjacent the valve seat is provided centrally with a tapered recess in which is seated the rounded stem 18 of an inlet valve 19 which is adapted to seat on the inlet valve seat.

The hole through the annular flange 15 at one end of the cradle is recessed on the side remote from the plug, and one end of a cylindrical exhaust valve seat 20 is seated in said recess, said valve seat slidably and fluid-tightly extending through a hole in the adjacent end of the operating chamber and projecting into an exhaust chamber 31 formed within the end of the housing. The exhaust nozzle 3 extends from said chamber to a fluid reservoir.

The end of the valve seat in the exhaust chamber is chamfered, the annular knife edge portion being at the outer periphery thereof. An exhaust valve 32, similar in all respects to the inlet valve, is adapted to seat on said valve seat and has a rounded stem on its other face to seat in a tapered recess in the adjacent end of an operating rod 33 which extends through the adjacent end wall of the housing and projects exterior of the housing.

The projecting end of the operating rod is provided with a co-axial blind hole and a pin 34 is loosely fitted therein, one end thereof seating on the base of the hole and the other end seated in a recess in one end of a lever 35 which is pivotally secured to the end of the housing, the fulcrum being located intermediate the ends thereof.

To operate the valve a load is applied to the end of the lever which in turn applies a considerably increased downward load on the end of the operating rod. This load, acting through the exhaust valve, valve seat and cradle overcomes the force of the spring to move the inlet valve seat away from the inlet valve. Pressure fluid from the source thus flows through the inlet valve, into the operating chamber and thence into the brakes.

With the inlet valve open, the pressure in the operating chamber rapidly increases and reacts against the operative face of the closed exhaust valve. When this upward force on the valve just exceeds the downward force on the plunger, the exhaust valve moves away from the operating chamber, thus permitting the spring-urged cradle to move after it, and the inlet valve seat will move up with the cradle until it is seating on the inlet valve once more. A braking pressure determined by the load on the plunger will thus be held in the brakes and operating chamber.

To increase the braking pressure, the downward load on the plunger is increased. This will again overcome the upward force on the exhaust valve and will open the inlet valve in the manner described, until the upward force on the exhaust valve, caused by the increased pressure in the operating chamber, just exceeds the downward load of the plunger, when the inlet valve will seat once more.

To release or reduce the braking pressure the downward load is reduced or removed from the plunger. The pressure in the operating chamber forces the exhaust valve upwards and, if the inlet valve is not already closed, said valve will close before the exhaust valve quits its seating and allows fluid pressure to flow through the valve to the reservoir.

The advantage of a fluid pressure control valve of this type are more fully described in our above mentioned Patent 2,682,282. The particular advantage of a control valve constructed in accordance with the present invention over the valves described in Patent 2,682,282 is that, owing to the "balanced" nature of the inlet valve the return spring may be of very low rating. The force required to crack the inlet valve and operate the control valve is thus even smaller than that required with valves described in that application.

Having now described our invention, what we claim is:

1. A fluid pressure control valve comprising a housing containing an operating chamber having a connection for a mechanism to be operated, an exhaust chamber at one end of and co-axial with said operating chamber and having a connection for exhaust and a co-axial passage between said chambers, an inlet tube axially slidable in the other end of the operating chamber to communicate with a source of fluid pressure, and having an inlet valve seat at its delivery end, an inlet valve to co-operate with said seat, an abutment fixed in said operating chamber in position to support said inlet valve in said chamber, a cradle slidable co-axially of said inlet tube in the operating chamber one end thereof being operatively associated with said inlet valve seat to move said valve seat away from said inlet valve, an exhaust valve seat in the exhaust chamber, a tubular portion integral with said exhaust valve seat slidably fitting through said passage and seated on the other end of the cradle, an exhaust valve associated with said exhaust valve seat, a plunger associated with said exhaust valve extending through the exhaust chamber and projecting exterior of said housing and a compression spring urging the inlet valve seat and cradle in a direction to close the inlet valve.

2. A fluid pressure control valve according to claim 1 wherein the valve seat end of the inlet tube is provided at its inner periphery with an inwardly extending step the radial width thereof being equal to the thickness of the wall of said connection fluid-tightly slidable in the housing, thereby balancing said connection when the inlet valve is closed.

3. A fluid pressure control valve according to claim 2 wherein a beam is secured diametrically across the operating chamber and passes through slots in said cradle, and an axially adjustable plug is screwed into the centre of said beam, one end of said plug being provided with a recess into which a rounded stem of the inlet valve is rockably seated.

References Cited in the file of this patent

UNITED STATES PATENTS

| | | |
|---|---|---|
| 1,593,648 | Berger | July 27, 1926 |
| 1,727,970 | Doty | Sept. 10, 1929 |
| 1,747,910 | Siefarth | Feb. 18, 1930 |
| 2,185,449 | Veenschoten | Jan. 2, 1940 |